United States Patent
Kosaka et al.

(10) Patent No.: US 9,477,023 B2
(45) Date of Patent: Oct. 25, 2016

(54) VISIBLE LIGHT-TRANSMISSIVE AND INFRARED-REFLECTIVE SUBSTRATE

(71) Applicant: NITTO DENKO CORPORATION, Ibaraki-shi, Osaka (JP)

(72) Inventors: Tokuhisa Kosaka, Ibaraki (JP); Junichi Fujisawa, Ibaraki (JP); Yutaka Ohmori, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 14/409,925

(22) PCT Filed: Jun. 21, 2013

(86) PCT No.: PCT/JP2013/067130
§ 371 (c)(1),
(2) Date: Dec. 19, 2014

(87) PCT Pub. No.: WO2013/191285
PCT Pub. Date: Dec. 27, 2013

(65) Prior Publication Data
US 2015/0192716 A1    Jul. 9, 2015

(30) Foreign Application Priority Data
Jun. 21, 2012 (JP) ................... 2012-140105

(51) Int. Cl.
*G02B 5/20* (2006.01)
*G02B 5/26* (2006.01)
(Continued)

(52) U.S. Cl.
CPC . *G02B 5/26* (2013.01); *B32B 7/12* (2013.01); *B32B 15/08* (2013.01); *B32B 27/06* (2013.01);
(Continued)

(58) Field of Classification Search
CPC ..... B32B 2307/00; B32B 7/02; B32B 17/10; B32B 27/00; B32B 27/06; G02B 5/208; G02B 5/26
USPC ........................... 359/359, 360, 361
See application file for complete search history.

(56) References Cited

U.S. PATENT DOCUMENTS

| 4,166,876 A |   | 9/1979 | Chiba et al. |
| 5,956,175 A | * | 9/1999 | Hojnowski ....... B32B 17/10018 359/360 |

(Continued)

FOREIGN PATENT DOCUMENTS

| CN | 101155765 A | 4/2008 |
| CN | 101156765 A | 4/2008 |

(Continued)

OTHER PUBLICATIONS

International Search Report dated Sep. 17, 2013, issued in corresponding application No. PCT/JP2013/067130.

(Continued)

*Primary Examiner* — Euncha Cherry
(74) *Attorney, Agent, or Firm* — Westerman, Hattori, Daniels & Adrian, LLP

(57) ABSTRACT

Provided is a visible light-transmissive and infrared-reflective substrate, including: a visible light-transmissive substrate layer disposed so as to serve as a partition between inside and outside of a room; and an infrared-reflective layer laminated on a surface on the room side of the visible light-transmissive substrate layer, wherein the visible light-transmissive substrate layer has a solar absorbance of at least 30%, the infrared-reflective layer includes a reflective layer configured to reflect infrared rays and a protective layer laminated on a surface on the room side of the reflective layer, and normal emissivity of a surface on the protective layer side of the infrared-reflective layer is not more than 0.50.

12 Claims, 1 Drawing Sheet

(51) Int. Cl.
  *B32B 27/06* (2006.01)
  *C03C 17/42* (2006.01)
  *G02B 1/14* (2015.01)
  *B32B 7/12* (2006.01)
  *B32B 15/08* (2006.01)
  *B32B 27/08* (2006.01)
  *B32B 27/16* (2006.01)

(52) U.S. Cl.
  CPC ............... *B32B 27/08* (2013.01); *B32B 27/16* (2013.01); *C03C 17/42* (2013.01); *G02B 1/14* (2015.01); *G02B 5/208* (2013.01); *B32B 2255/10* (2013.01); *B32B 2307/304* (2013.01); *B32B 2307/40* (2013.01); *B32B 2307/414* (2013.01); *B32B 2307/416* (2013.01); *B32B 2307/584* (2013.01); *B32B 2419/00* (2013.01); *B32B 2605/00* (2013.01)

(56) References Cited

U.S. PATENT DOCUMENTS

| | | |
|---|---|---|
| 2007/0237968 A1 | 10/2007 | Kijima et al. |
| 2008/0090073 A1 | 4/2008 | Tomonaga et al. |
| 2009/0237782 A1 | 9/2009 | Takamatsu et al. |
| 2011/0308693 A1 | 12/2011 | Van Nutt et al. |

FOREIGN PATENT DOCUMENTS

| | | |
|---|---|---|
| CN | 101231350 A | 7/2008 |
| CN | 101288007 A | 10/2008 |
| CN | 201773236 U | 3/2011 |
| JP | 58-010228 B2 | 2/1983 |
| JP | 61-051762 B2 | 11/1986 |
| JP | 07-010609 A | 1/1995 |
| JP | 07-315889 A | 12/1995 |
| JP | 11-157881 A | 6/1999 |
| JP | 2001-179887 A | 7/2001 |
| JP | 2001-310407 A | 11/2001 |
| JP | 2005-343113 A | 12/2005 |
| JP | 2011-207223 A | 10/2011 |
| JP | 2012-013965 A | 1/2012 |
| JP | 2012-018228 A | 1/2012 |
| JP | 2012-032759 A | 2/2012 |
| WO | 03042122 A2 | 5/2003 |
| WO | 2013/122227 A1 | 8/2013 |

OTHER PUBLICATIONS

Notification of Transmittal of Translation of the International Preliminary Report on Patentability (form PCT/IB/338) of International Application No. PCT/JP2013/067130, mailing date of Dec. 31, 2014, with forms PCT/IB/373, PCT/ISA/237 and PCT/IB/326 (11 pages).

Chinese Office Action dated Dec. 11, 2015, issued in counterpart Chinese Patent Application No. 201380033062.6. (6 pages).

Extended European Search Report dated Dec. 23, 2015, issued in counterpart European Patent Application No. 13807056.0. (7 pages).

\* cited by examiner

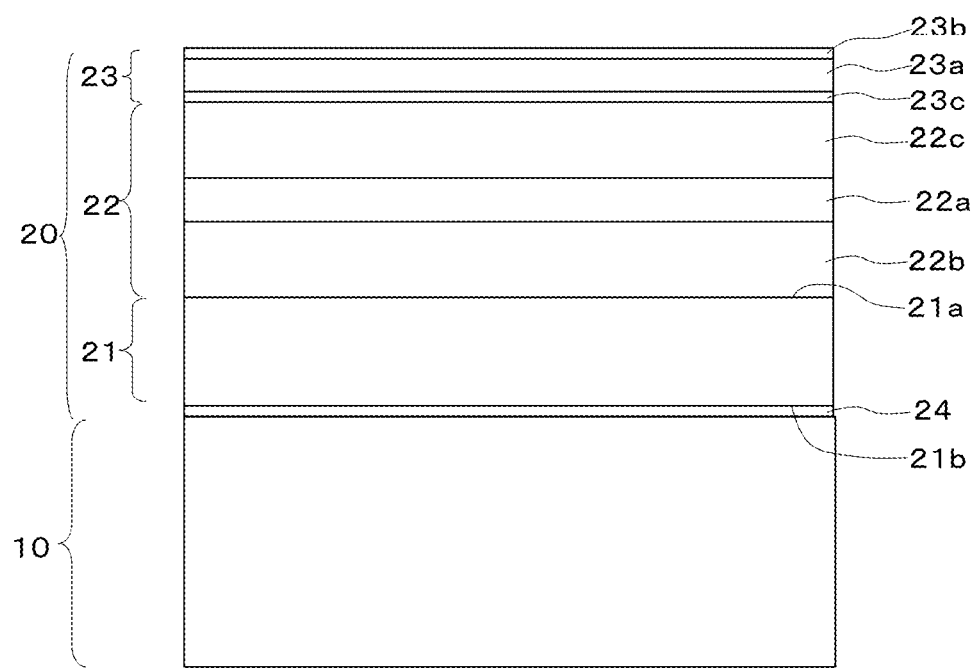

VISIBLE LIGHT-TRANSMISSIVE AND INFRARED-REFLECTIVE SUBSTRATE

FIELD

The present invention relates to a visible light-transmissive and infrared-reflective substrate having high reflectivity in the infrared region.

BACKGROUND

Conventionally, infrared-reflective films having a function to reflect infrared rays are widely known. Such an infrared-reflective film is mainly used for suppressing the thermal effects of radiated sunlight (solar radiation). For example, an infrared-reflective film of this type is attached to a visible light-transmissive substrate such as glass and a transparent resin plate installed in cars, trains, houses, or the like, thereby blocking infrared rays (particularly, near-infrared rays) entering the room through the visible light-transmissive substrate. This suppresses the temperature increase inside the room.

An infrared-reflective film disclosed in Patent Literature 1 is a laminate film, in which an aluminum deposition layer with a visible light transmittance of 15 to 75% and a hard coating layer made of resin that is cured by ultraviolet rays or electron beams are sequentially laminated on one surface of a polyester film and a glue layer is provided on the other surface thereof. When this laminate film is attached to window glass, the aluminum deposition layer is configured to reflect the near-infrared rays contained in sunlight.

An infrared-reflective film disclosed in Patent Literature 2 is a laminate film in which a metal thin film layer with a visible light transmittance of at least 70% and a hard coating layer made of resin that is cured by heat or ultraviolet rays are sequentially laminated on one surface of a thermoplastic resin film such as a biaxially stretched polyethylene terephthalate (PET) film and an acrylic glue is provided on the other surface thereof. When this laminate film is attached to window glass, the metal thin film layer is configured to reflect the near-infrared rays contained in sunlight.

CITATION LIST

Patent Literatures

Patent Literature 1: JP 2005-343113 A
Patent Literature 2: JP 2001-179887 A

SUMMARY

Technical Problem

Meanwhile, for example, when solar radiation enters the room from the outdoors through the window glass of a car, the room temperature increases due to the thermal effects of the incoming solar radiation, with which the room cooling load increases. Therefore, in order to suppress the penetration of solar radiation into the room and reduce the room cooling load, green glass or smoke glass configured to absorb and/or reflect solar radiation is used as the window glass, or a heat shielding film having a function to reflect solar radiation as described above is laminated on the glass.

It is known that solar radiation contains electromagnetic waves having a plurality of wavelengths ranging from the ultraviolet region to the infrared region, whereas solar radiation in the infrared region contains only electromagnetic waves in the near-infrared region having a wavelength up to about 2500 µm and hardly contains electromagnetic waves in the far-infrared region having a wavelength exceeding 2500 µm. Accordingly, it has been believed that the penetration of solar radiation into the room is suppressed and the room cooling load is sufficiently reduced by using green glass or smoke glass configured to absorb and/or reflect solar radiation as the window glass, or laminating a heat shielding film on the room side of the glass. However, it is difficult to sufficiently reduce the room cooling load only by using such glass or a heat shielding film as mentioned above, which is a problem.

As a reason for that, it is conceivable that the aforementioned glass absorbs electromagnetic waves in the near-infrared region contained in solar radiation due to its high solar absorbance, so as to suppress the penetration of solar radiation (near-infrared rays) into the room, whereas the glass itself undergoes a temperature increase due to the near-infrared rays.

Further, it is generally known that all substances radiate electromagnetic waves containing electromagnetic waves in the far-infrared region at about room temperature, and the amount of radiation of electromagnetic waves in the far-infrared region increases as the temperature increases. In this way, electromagnetic waves containing electromagnetic waves in the far-infrared region are radiated to the room side and the outdoor side also from the glass having an increased temperature. Therefore, it is conceivable that the room temperature increases due to thermal effects of reradiation, because far-infrared rays radiated from the glass having an increased temperature are reradiated into the room, thereby causing a failure to sufficiently prevent the thermal effects of reradiation of the far-infrared rays.

In this case, it is conceivable that, although the transmitted amount of solar radiation can be reduced by laminating a heat shielding film on the room side of the glass, the reradiation of far-infrared rays from the glass to the room side cannot be suppressed because the emissivity of the surface on the room side is high, resulting in a temperature increase inside the room due to the thermal effects of reradiation.

Alternatively, for example, it is also conceivable to suppress the reradiation of far-infrared rays from the glass to the room side by forming a reflective layer by direct vapor deposition of a metal layer on the glass, so as to reduce the emissivity of the surface on the room side. However, in this case, there remains a problem such as poor durability due to exposure of the reflective layer having low abrasion resistance.

The present invention has been devised in view of such circumstances, and an object thereof is to provide a visible light-transmissive and infrared-reflective substrate capable of reducing reradiation heat entering the room side due to reradiation from a visible light-transmissive substrate layer having high solar absorbance, so as to suppress a temperature increase inside the room, and having good durability (abrasion resistance).

Solution to Problem

A visible light-transmissive and infrared-reflective substrate according to the present invention includes: a visible light-transmissive substrate layer disposed so as to serve as a partition between inside and outside of a room; and an infrared-reflective layer laminated on a surface on the room side of the visible light-transmissive substrate layer, wherein the visible light-transmissive substrate layer has a solar absorbance of at least 30%, the infrared-reflective layer includes a reflective layer configured to reflect infrared rays and a protective layer laminated on a surface on the room side of the reflective layer, and normal emissivity of a surface on the protective layer side of the infrared-reflective layer is not more than 0.50.

According to the visible light-transmissive and infrared-reflective substrate configured as above, solar transmittance is reduced by the infrared-reflective layer. Therefore, sunlight (near-infrared rays) directly entering the room from the outdoors through the visible light-transmissive substrate layer can be reduced. Further, upon reaching the visible light-transmissive substrate layer disposed so as to serve as a partition between the inside and outside of a room, the sunlight (near-infrared rays) entering the room from the outdoors is transmitted through, reflected on, or absorbed by the visible light-transmissive substrate layer.

When sunlight (near-infrared rays) is absorbed by the visible light-transmissive substrate layer, the temperature of the visible light-transmissive substrate layer increases accordingly. When the temperature of the visible light-transmissive substrate layer increases, the temperature of the reflective layer and the protective layer also increases due to the heat conducted from the visible light-transmissive substrate layer. As a result, the temperature of the reflective layer and the protective layer becomes nearly equal to the temperature of the visible light-transmissive substrate layer. Then, far-infrared rays are reradiated toward the room from the surface on the room side of the visible light-transmissive and infrared-reflective substrate having an increased temperature. It is known that a radiant heat flux ($E[W/m^2]$) emitted by an object having a surface temperature T [K] is expressed as $E=\epsilon\sigma T^4$ ($\epsilon$: emissivity, $\sigma$: Stefan-Boltzmann constant ($5.67\times10^{-8}$ $W/m^2K^4$), T: surface temperature [K]) according to the Stefan-Boltzmann law, and the radiant heat flux is proportional to the emissivity. Accordingly, in the visible light-transmissive and infrared-reflective substrate configured as above, the normal emissivity of the surface on the protective layer side is as low as 0.50 or less, and therefore the reradiation heat into the room is low as well. As a result, it is possible to reduce the reradiation heat into the room due to reradiation from the surface on the room side of the visible light-transmissive substrate layer having high solar absorbance, so as to suppress a temperature increase inside the room. Further, the infrared-reflective layer includes the protective layer. Therefore, exposure of the reflective layer having low abrasion resistance is prevented, and thus good durability (abrasion resistance) can be achieved.

Normal emissivity is expressed as Normal emissivity ($\epsilon n$)=1−Spectral reflectance ($\rho n$), as prescribed in JIS R3106. The spectral reflectance $\rho n$ is measured with heat radiation in the wavelength range of 5 to 50 μm at room temperature. The wavelength range of 5 to 50 μm is in the far-infrared region. As the reflectance in the wavelength range of far-infrared rays increases, the normal emissivity decreases.

According to another aspect, the visible light-transmissive and infrared-reflective substrate of the present invention includes: a visible light-transmissive substrate layer disposed so as to serve as a partition between inside and outside of a room, the visible light-transmissive substrate layer having a visible light transmittance of at least 50%; and an infrared-reflective layer laminated on a surface on the room side of the visible light-transmissive substrate layer, the infrared-reflective layer having a visible light transmittance of not more than 50%, wherein the visible light-transmissive substrate layer has a solar absorbance of at least 30%, the infrared-reflective layer includes a reflective layer configured to reflect infrared rays and a protective layer laminated on a surface on the room side of the reflective layer, and normal emissivity of a surface on the protective layer side of the infrared-reflective layer is not more than 0.50.

In the visible light-transmissive and infrared-reflective substrate configured as above, the visible light-transmissive substrate layer having a visible light transmittance of at least 50% is used. Accordingly, the solar transmittance of the visible light-transmissive substrate layer itself is higher, though the solar absorbance of the visible light-transmissive substrate layer itself is lower, as compared to a visible light-transmissive and infrared-reflective substrate including a visible light-transmissive substrate layer having a visible light transmittance of less than 50%. According to the visible light-transmissive and infrared-reflective substrate configured as above, the solar transmittance is reduced by the infrared-reflective layer. Therefore, sunlight (near-infrared rays) directly entering the room from the outdoors through the visible light-transmissive substrate layer can be reduced. Further, formation of the infrared-reflective layer on the visible light-transmissive substrate layer can suppress a temperature increase inside the room by reducing the reradiation heat due to the far-infrared rays reradiated from the visible light-transmissive substrate layer to the room side, while increasing the solar absorbance. Further, the infrared-reflective layer having low visible light transmittance is laminated on the visible light-transmissive substrate layer having high visible light transmittance, which makes it difficult to see the interior of the room from the outdoors through visible light-transmissive substrate layer. Thus, privacy protection, for example, can be given.

In the visible light-transmissive and infrared-reflective substrate according to the present invention, it is preferable that the infrared-reflective layer be an infrared-reflective film attached to the surface on the room side of the visible light-transmissive substrate layer. According to such a configuration, the visible light-transmissive substrate layer and the infrared-reflective layer can be formed as separate members. Therefore, the infrared-reflective layer can be applied to visible light-transmissive substrates installed in general cars, railroads, houses, or the like, which allows high versatility.

In the visible light-transmissive and infrared-reflective substrate according to the present invention, it is preferable that the visible light-transmissive substrate layer be glass or a resin substrate.

Further, in the visible light-transmissive and infrared-reflective substrate according to the present invention, it is preferable that the protective layer include a hard coating layer laminated on the reflective layer. According to such a configuration, abrasion resistance is given to the protective layer by the hard coating layer.

Advantageous Effects of Invention

As has been described above, the visible light-transmissive and infrared-reflective substrate according to the present invention can exert excellent effects of being capable of reducing reradiation heat entering the room side due to reradiation from a visible light-transmissive substrate layer having high solar absorbance, so as to suppress a temperature increase inside the room, and having good durability (abrasion resistance).

BRIEF DESCRIPTION OF DRAWINGS

FIG. 1 shows a schematic view for explaining a layer structure of a visible light-transmissive and infrared-reflective substrate according to an embodiment of the present invention.

DESCRIPTION OF EMBODIMENTS

Hereinafter, an embodiment of a visible light-transmissive and infrared-reflective substrate according to the present invention is described with reference to FIG. 1.

First Embodiment

A visible light-transmissive and infrared-reflective substrate according to this embodiment is formed for the purposes of heat shielding and heat insulating. As shown in FIG. 1, the visible light-transmissive and infrared-reflective substrate includes a visible light-transmissive substrate layer 10 disposed so as to serve as a partition between the inside and outside of a room, and an infrared-reflective layer 20 laminated on the surface on the room side of the visible light-transmissive substrate layer 10. It should be noted that FIG. 1 shows the thickness of the visible light-transmissive substrate layer 10 relative to the thickness of the infrared-reflective layer 20 as being smaller than its actual thickness for convenience of description.

The visible light-transmissive substrate layer 10 according to this embodiment has a solar absorbance of 30% or more. As the visible light-transmissive substrate layer 10, green glass, smoke glass, or the like, having high solar absorbance is employed. However, the visible light-transmissive substrate layer 10 is not limited to green glass, smoke glass, or the like, as employed in this embodiment. For example, a resin substrate such as resin glass may be employed, as long as it has a solar absorbance of 30% or more. It also may have a solar absorbance, for example, of 40% or more, or 50% or more.

The infrared-reflective layer 20 according to this embodiment is an infrared-reflective film laminated on (attached to) the surface on the room side of the visible light-transmissive substrate layer 10. The infrared-reflective layer 20 includes a reflective layer 22 configured to reflect infrared rays and a protective layer 23 laminated on the surface on the room side of the reflective layer 22. More specifically, the infrared-reflective layer 20 has a layer structure in which the reflective layer 22 and the protective layer 23 are laminated in this order on a first surface 21a of a base material 21, and a glue layer 24 is provided on a second surface 21b thereof. The normal emissivity of the surface on the protective layer 23 side of the infrared-reflective layer 20 is set to 0.50 or less, based on the experimental results, which will be described below. The normal emissivity of the surface on the protective layer 23 side of the infrared-reflective layer 20 is preferably 0.40 or less, further preferably 0.30 or less.

As the base material 21, polyester films are used. Examples thereof include such as films made of polyethylene terephthalate, polyethylene naphthalate, polypropylene terephthalate, polybutylene terephthalate, polycyclohexylenemethylene terephthalate, and mixed resins combining two or more of these. Among these, a polyethylene terephthalate (PET) film is preferable, and a biaxially stretched polyethylene terephthalate (PET) film is particularly suitable, in view of the performance.

The reflective layer 22 is a vapor deposition layer formed on the surface (first surface) 21a of the base material 21 by vapor deposition. As a method for forming the vapor deposition layer, physical vapor deposition (PVD) such as sputtering, vacuum vapor deposition, and ion plating can be mentioned, for example. In vacuum vapor deposition, a deposition material is heated and evaporated, using a method such as resistance heating, electron beam heating, laser beam heating, and arc discharge under vacuum. Thus, the reflective layer 22 is formed on the base material 21. Further, in sputtering, cations such as Ar+ which have been accelerated, for example, by glow discharge are allowed to collide with a target (deposition material) so that the deposition material is sputtered and evaporated under vacuum in the presence of an inert gas such as argon. Thus, the reflective layer 22 is formed on the base material 21. Ion plating is a vapor deposition method combining vacuum vapor deposition and sputtering. In this method, evaporated atoms released by heating are ionized and accelerated in an electric field, which are deposited on the base material 21 in a high energy state under vacuum. Thus, the reflective layer 22 is formed.

The reflective layer 22 has a multilayer structure in which a semi-transparent metal layer 22a is sandwiched by a pair of transparent layers 22b and 22c. The reflective layer 22 is formed, using the aforementioned method for forming a vapor deposition layer, by first vapor depositing the transparent layer 22b on the surface (first surface) 21a of the base material 21, next vapor depositing the semi-transparent metal layer 22a on the transparent layer 22b, and finally vapor depositing the transparent layer 22c on the semi-transparent metal layer 22a. Examples of a material for forming the semi-transparent metal layer 22a include aluminum (such as Al), silver (such as Ag), silver alloy (such as MgAg, APC (AgPdCu), AgCu, AgAuCu, AgPd, and AgAu), aluminum alloy (such as AlLi, AlCa, and AlMg), and a metal material combining two or more of these. Further, the semi-transparent metal layer 22a may be formed in two or more layers using these metal materials. The transparent layers 22b and 22c serve to give transparency to the reflective layer 22 and to prevent deterioration of the semi-transparent metal layer 22a. For example, oxides such as indium tin oxide (ITO), indium titanium oxide (ITiO), indium zinc oxide (IZO), gallium zinc oxide (GZO), aluminum zinc oxide (AZO), and indium gallium oxide (IGO) are used therefor.

The protective layer 23 includes a resin layer 23a laminated on the reflective layer 22, and a hard coating layer 23b formed on the resin layer 23a. The protective layer 23 is bonded onto the reflective layer 22 with an adhesive. That is, the protective layer 23 has a multilayer structure including an adhesive layer 23c, the resin layer 23a, and the hard coating layer 23b sequentially from the reflective layer 22 side. The hard coating layer 23b serves as the surface (outermost layer) of the infrared-reflective layer 20 of this embodiment.

As the resin layer 23a, olefin films are used, for example. Examples of the olefin films to be used herein include films made of high-density polyethylene, low-density polyethylene, and linear low-density polyethylene, which are obtained by homo- or copolymerization of ethylene, polypropylene and polymethylpentene, which are obtained by homo- or copolymerization of propylene, and mixed resins combining two or more of these. Among these, the resin layer 23a is preferably a polypropylene (PP) film, particularly suitably a biaxially stretched polypropylene (OPP) film, in view of the performance. In the case where the resin layer 23a is an olefin film, the thickness of the resin layer 23a is preferably 5 to 30 μm.

Further, the resin layer 23a may be a layer having a crosslinked structure of polymers each containing repeating units A represented by Formula I below.

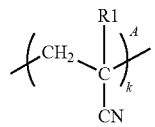

(I)

(R1: H or methyl group, k: repetition number)

Further, the resin layer 23a preferably contains polymers each containing at least two or more of the repeating units A, B, and C in Formula II below. As R1 in Formula II, H or a methyl group may be used. Further, H, or an alkyl group or alkenyl group having 1 to 4 carbon atoms may be used as R2 to R5 in Formula II. Incidentally, hydrogenated nitrile rubber (HNBR) is composed of the repeating units A, B, and C and uses H as R1 to R5.

The repetition number k is preferably 10 to 1000.

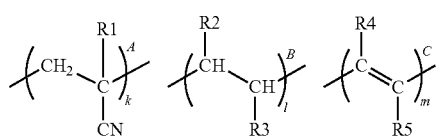

(II)

(R1: H or methyl group, R2 to R5: H, or alkyl group or alkenyl group having 1 to 4 carbon atoms, k, l, and m: repetition number)

Examples of monomer components for obtaining such polymers include a copolymer of acrylonitrile (repeating unit D) and its derivatives, alkyl (repeating unit E) having 4 carbon atoms and its derivatives, and butadiene (repeating unit F1 or F2) and its derivatives, as represented by Formula III. Here, R6 denotes H or a methyl group, and R7 to R18 denote H or an alkyl group having 1 to 4 carbon atoms. F1 and F2 each denote a repeating unit in which butadiene is polymerized, where F1 is a main repeating unit. Further, these polymers may be nitrile rubber that is a copolymer of acrylonitrile (repeating unit D) and its derivatives, and 1,3-butadiene (repeating unit F1) and its derivatives, as shown in Formula III, or hydrogenated nitrile rubber in which double bonds contained in nitrile rubber is partially or totally hydrogenated.

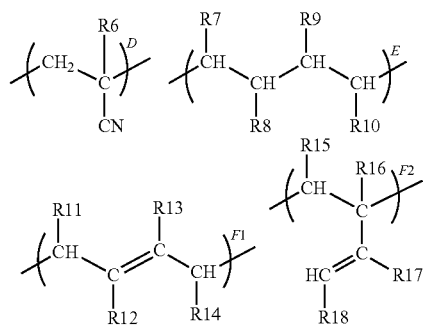

(III)

(R6: H or methyl group, R7 to R18: H, or alkyl group having 1 to 4 carbon atoms)

With reference to Formula IV as a cut part of the aforementioned copolymer, a relationship between a copolymer in which acrylonitrile, butadiene, and alkyl are polymerized, and their respective repeating units A, B, and C is described. Formula IV is a cut part of a polymer chain used for the resin layer 23a, in which 1,3-butadiene (repeating unit F1), acrylonitrile (repeating unit D), and 1,3-butadiene (repeating unit F1) are sequentially bonded. Formula IV shows a bonding example in which R7 and R11 to R14 each denote H. In Formula IV, butadiene on the left is bonded to acrylonitrile on the side to which the cyano group (—CN) is bonded, and butadiene on the right is bonded to acrylonitrile on the side to which the cyano group (—CN) is not bonded. In such a bonding example, one repeating unit A, one repeating unit B, and two repeating units C are contained. Among these, there is a combination of the repeating unit A containing a carbon atom to which a carbon atom on the right of butadiene on the left and the cyano group (—CN) of acrylonitrile are bonded, and the repeating unit B containing a carbon atom to which the cyano group (—CN) of acrylonitrile is not bonded and a carbon atom on the left of butadiene on the right. The carbon atom on the leftmost of butadiene on the left and the carbon atom on the rightmost of butadiene on the right each serve as a carbon atom that is a part of a repeating unit A or a repeating unit B, depending on the kind of molecules to which they are bonded.

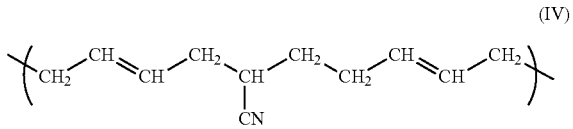

(IV)

The resin layer 23a as described above is formed by preparing a solution by dissolving the aforementioned polymers (together with a crosslinking agent, as needed) in a solvent, and applying the thus obtained solution onto the reflective layer 22, followed by drying the solution (volatilizing the solvent). In this case, a configuration in which the protective layer 23 does not have the adhesive layer may be employed. The solvent is the polymer-soluble solvent described above. Examples thereof include solvents such as methyl ethyl ketone (MEK) and methylene chloride (dichloromethane). It should be noted that methyl ethyl ketone and methylene chloride are solvents having a low boiling point (methyl ethyl ketone has a boiling point of 79.5° C., and methylene chloride has a boiling point of 40° C.). Accordingly, use of these solvents allows the solvents to be volatilized at a low drying temperature, and therefore the base material 21 (or the reflective layer 22) is prevented from being thermally damaged.

In the case where the resin layer 23a is a layer having the aforementioned polymers, the lower limit of the thickness of the resin layer 23a is 1 μm or more. Preferably, it is 3 μm or more. Further, the upper limit thereof is 20 μml or less. Preferably, it is 15 μm or less. More preferably, it is 10 μm or less. When the resin layer 23a has a small thickness, the abrasion resistance is impaired, whereas the reflective properties of infrared rays are increased. As a result, functions as the protective layer 23a cannot be sufficiently exerted. When the resin layer 23a has a large thickness, the heat insulating properties of the infrared-reflective film are deteriorated.

When the resin layer 23a has a thickness within the aforementioned range, the resin layer 23a having low infrared absorption and being capable of suitably protecting the reflective layer 22 is obtained.

In Formula I, the ratio of k, l, and m is preferably k:l:m=3 to 30:20 to 95:0 to 60, more preferably k:l:m=5 to 25:60 to 90:0 to 20, further preferably k:l:m=15 to 25:65 to 85:0 to 10, when the total of k, l, and m is 100.

Further, the ratio of the total weight of the repeating units A, B, and C in Formula I is preferably A:B:C=5 to 50 wt %:25 to 85 wt %:0 to 60 wt % (however, the total of A, B, and C is 100 wt %). More preferably, it is A:B:C=15 to 40 wt %:55 to 85 wt %:0 to 20 wt % (however, the total of A, B, and C is 100 wt %). Further preferably, it is A:B:C=25 to 40 wt %:55 to 75 wt %:0 to 10 wt % (however, the total of A, B, and C is 100 wt %).

In order to impart good solvent resistance to the resin layer 23a, it is preferable that the resin layer 23a have a crosslinked structure of polymers. When polymers are crosslinked to each other, the solvent resistance of the resin layer 23a is improved. Therefore, it is possible to prevent elution of the resin layer 23a even in the case where the resin layer 23a is brought into contact with the polymer-soluble solvent.

As a technique to give the polymers a crosslinked structure, electron beam irradiation after drying the solution can be mentioned. The lower limit of the total dose of electron beam irradiation is 50 kGy or more. Preferably, it is 100 kGy or more. More preferably, it is 200 kGy or more. Further, the upper limit thereof is 1000 kGy or less. Preferably, it is 600 kGy or less. More preferably, it is 400 kGy or less. It should be noted that the total irradiation dose herein means a dose of electron beam irradiation in the case of one-time irradiation, or a total of irradiation doses in the case of multiple times of electron beam irradiation. It is preferable that the dose of one-time electron beam irradiation be 300 kGy or less. When the total dose of electron beam irradiation falls within the aforementioned range, polymers can be sufficiently crosslinked to each other. Further, when the total dose of electron beam irradiation falls within the aforementioned range, it is possible to suppress yellowing of the polymers or the base material 1 caused by electron beam irradiation to the minimum, so that an infrared-reflective film having less coloration can be obtained. Such conditions of electron beam irradiation suppose that the acceleration voltage is 150 kV.

Further, when the polymers are dissolved in the solvent, or after the polymers are dissolved in the solvent, a crosslinking agent such as polyfunctional monomers, e.g., radically polymerized monomers, is preferably added thereto. Particularly, radically polymerized (meth)acrylate monomers are preferable. Addition of such polyfunctional monomers causes functional groups contained in the polyfunctional monomers to react with (be bonded to) the respective polymer chains, thereby facilitating crosslinking of the polymers (via the polyfunctional monomers). Accordingly, even when the total dose of electron beam irradiation is reduced (to about 50 kGy), polymers can be sufficiently crosslinked. Therefore, a low total dose of electron beam irradiation can be achieved. Further, the reduction in total dose of electron beam irradiation can further suppress yellowing of the polymers or the base material 21 and improve the productivity.

However, as the amount of additive increases, the normal emissivity of the surface on the resin layer 23a side of the infrared-reflective film (with reference to the reflective layer 22) decreases. When the normal emissivity decreases, the infrared-reflective properties of the infrared-reflective film are reduced, and the heat insulating properties of the infrared-reflective film are degraded. Therefore, the amount of additive is preferably 1 to 35 wt % with respect to the polymers. More preferably, it is 2 to 25 wt % with respect to the polymers.

Like the base material 21 and the resin layer 23a, the hard coating layer 23b has transparency and abrasion resistance for preventing a reduction in transparency due to abrasion scratches made on the surface, for example, during cleaning. The hard coating layer 23b is not specifically limited, as long as it exhibits sufficient abrasion resistance (hardness). Examples thereof include an ionizing radiation curable resin, a thermosetting resin, and a thermoplastic resin. Among these, an ionizing radiation curable resin such as an ultraviolet curable resin that allows a layer to be easily formed and allows the lead brush hardness to be easily increased to a desired value is suitable as the hard coating layer 23b. Examples of the ionizing radiation curable resin to be used include an ultraviolet curable acrylic-urethane hard coating.

In the case of forming the hard coating layer 23b using an ionizing radiation curable resin, the hard coating layer 23b is formed by directly applying the ionizing radiation curable resin, or applying a solution obtained by diluting the ionizing radiation curable resin with an organic solvent to a suitable concentration, onto the resin layer 23a using an applicator (coater), followed by drying, as needed, and irradiation with ionizing radiation using an ionizing radiation irradiate lamp for several seconds to several minutes. In the case of forming the hard coating layer 23b using a thermosetting resin, a solution of the thermosetting resin in an organic solvent is applied onto the resin layer 23a using an applicator (coater), and a separation sheet is provided thereon, which is degassed, for example, using a laminator, followed by thermosetting and thermocompression bonding. In the case of not using the separation sheet, the hard coating layer 23b is formed by inserting a drying step before heating and compression bonding so as to evaporate the solvent, so that the surface is dried to an extent such that it does not stick. It should be noted that the thickness of the hard coating layer 23b is preferably 0.5 to 10 μm.

The adhesive layer 23c is formed using a polyester adhesive. After the hard coating layer 23b is formed on an olefin film that serves as the resin layer 23a, the polyester adhesive is applied to the surface of the olefin film opposite to the hard coating layer 23b, which is laminated on the reflective layer 22, followed by drying. Thus, the visible light-transmissive and infrared-reflective substrate according to this embodiment is completed. It should be noted that the thickness of the adhesive layer 23c is preferably 0.1 to 1.5 μm.

Further, the visible light-transmissive and infrared-reflective substrate according to this embodiment employs a double-layer structure composed of the resin layer 23a and the hard coating layer 23b as the protective layer 23. The hard coating layer 23b has poorer adhesion to the reflective layer 22 than the resin layer 23a (precisely, the adhesive layer 23c). Accordingly, if the hard coating layer 23b is directly laminated on the reflective layer 22 without the resin layer 23a, water, etc., penetrates into the interface between the reflective layer 22 and the hard coating layer 23b, which may probably result in deterioration of the reflective layer 22 and impairment of the abrasion resistance. However, in the visible light-transmissive and infrared-reflective substrate according to this embodiment, the hard coating layer 23b is formed via the resin layer 23a, and therefore there are no such concerns.

In the visible light-transmissive and infrared-reflective substrate according to this embodiment configured as above, the solar transmittance is reduced by the infrared-reflective layer 20, and therefore sunlight (near-infrared rays) directly entering the room from the outdoors through the visible light-transmissive substrate layer 10 can be reduced. Further, upon reaching the visible light-transmissive substrate layer 10, the sunlight (near-infrared rays) entering the room from the outdoors is transmitted through, reflected on, or absorbed by the visible light-transmissive substrate layer 10. The temperature of the visible light-transmissive substrate layer 10 increases due to the sunlight (near-infrared rays) absorbed by the visible light-transmissive substrate layer 10. The temperature increase of the visible light-transmissive substrate layer 10 causes a temperature increase of the reflective layer 22 and the protective layer 23 due to the heat conducted from the visible light-transmissive substrate layer 10, thereby allowing the temperature of the reflective layer 22 and the protective layer 23 to be nearly equal to the temperature of the visible light-transmissive substrate layer 10. Then, far-infrared rays are reradiated toward the room from the surface on the room side of the visible light-transmissive substrate layer 10 having an increased temperature. It is known that a radiant heat flux ($E[W/m^2]$) emitted by an object having a surface temperature T [K] is expressed as $E=\epsilon\sigma T^4$ ($\epsilon$: emissivity, $\sigma$: Stefan-Boltzmann constant ($5.67 \times 10^{-8}$ $W/m^2K^4$), T: surface temperature [K]) according to the Stefan-Boltzmann law, and the radiant heat flux is proportional to the emissivity. Accordingly, in the visible light-transmissive and infrared-reflective substrate according to this embodiment, the normal emissivity of the surface on the protective layer 23 side is as low as 0.50 or less, and therefore the reradiation heat into the room is low as well. As a result, it is possible to reduce the reradiation heat into the room due to reradiation from the surface on the room side of the visible light-transmissive substrate layer 10 having high solar absorbance, so as to suppress a temperature increase inside the room. Further, the infrared-reflective layer 20 includes the protective layer 23. Therefore, exposure of the reflective layer 22 having low abrasion resistance is prevented, and thus good durability (abrasion resistance) can be achieved.

EXAMPLES

The inventors fabricated visible light-transmissive and infrared-reflective substrates according to the aforementioned embodiment (Examples 1 to 4), and also fabricated visible light-transmissive and infrared-reflective substrates for comparison (Comparative Examples 1 to 3). The following fabrication method was employed in Examples 1 to 3. The reflective layer 22 was first laminated on the first surface 21a of the base material 21 by DC magnetron sputtering. Specifically, the transparent layer 22b was first laminated on the first surface 21a of the base material 21 by DC magnetron sputtering, the semi-transparent metal layer 22a was then laminated thereon by DC magnetron sputtering, and the transparent layer 22c was finally laminated thereon by DC magnetron sputtering. Further, a hard coating agent ("acrylic-urethane hard coating PC1097", manufactured by DIC Corporation) was applied to the surface of the resin layer 23a, which was irradiated with ultraviolet rays so as to be cured. Thus, the hard coating layer 23b was formed. Then, a polyester adhesive was applied to the surface of the resin layer 23a on the opposite side, and a laminate of the resin layer 23a and the hard coating layer 23b was bonded to the surface of the reflective layer 22 via the adhesive layer 23c. Thus, the infrared-reflective layer 20 was fabricated.

The thus fabricated infrared-reflective layer 20 was laminated on the visible light-transmissive substrate layer (green glass) 10 via a glue layer. Thus, a visible light-transmissive and infrared-reflective substrate was fabricated. Table 1 below shows conditions such as the composition/components and thickness of each layer.

Further, the following fabrication method was employed in Comparative Example 1. A PET layer was provided on the hard coating layer 23b of the infrared-reflective layer 20 fabricated by the aforementioned fabrication method via a glue layer. Then, the thus fabricated infrared-reflective layer 20 was laminated on the visible light-transmissive substrate layer (hereinafter, referred to as green glass in Examples and Comparative Examples) 10 via a glue layer. Thus, a visible light-transmissive and infrared-reflective substrate was fabricated. Table 1 below shows conditions such as the composition/components and thickness of each layer.

Example 1

A polyethylene terephthalate (PET) film having a thickness of 50 μm was used as the base material 21. Further, the transparent layer 22b made of indium tin oxide (ITO) was formed on the base material 21 to have a thickness of 35 nm. The semi-transparent metal layer 22a made of APC (AgPdCu) was formed thereon to have a thickness of 11.5 nm. The transparent layer 22c made of indium tin oxide (ITO) was formed thereon to have a thickness of 35 nm. Thus, the reflective layer 22 was formed. Further, the hard coating layer 23b was formed to have a thickness of 1 μm on the resin layer 23a made of a biaxially stretched polypropylene (OPP) film having a thickness of 15 μm, which was laminated on the reflective layer 22 via the adhesive layer 23c having a thickness of 1 μm. Thus, the protective layer 23 was formed. Then, the thus fabricated infrared-reflective layer 20 was laminated on the green glass 10 having a thickness of 3.86 mm via a glue layer having a thickness of 12 μm. Thus, a visible light-transmissive and infrared-reflective substrate was fabricated.

Example 2

This example is the same as Example 1 except that the transparent layer 22b made of indium titanium oxide (ITiO) was formed on the base material 21 to have a thickness of 31 nm, the semi-transparent metal layer 22a made of APC (AgPdCu) was formed thereon to have a thickness of 14 nm, and the transparent layer 22c made of indium titanium oxide (ITiO) was formed thereon to have a thickness of 31 nm.

Example 3

This example is the same as Example 1 except that the transparent layer 22b made of indium titanium oxide (ITiO) was formed on the base material 21 to have a thickness of 31 nm, the semi-transparent metal layer 22a made of APC (AgPdCu) was formed thereon to have a thickness of 18 nm, and the transparent layer 22c made of indium titanium oxide (ITiO) was formed thereon to have a thickness of 31 nm.

Example 4

Using the same base material 21 as in Example 1, the transparent layer 22b made of indium zinc oxide (IZO) was formed on the first surface 21a of the base material 21 to have a thickness of 30 nm, the semi-transparent metal layer 22a made of AP (AgPd) was formed thereon to have a thickness of 14 nm, and the transparent layer 22c made of indium zinc oxide (IZO) was formed thereon to have a thickness of 30 nm. Thus, the reflective layer 22 was formed.

Further, the resin layer 23a was formed on the reflective layer 22 by coating. Specifically, a 10%-methyl ethyl ketone (MEK) solution of hydrogenated nitrile rubber (product name "Therban 5065", manufactured by LANXESS [k:33.3, l:63, m:3.7, R1 to R3:H]) was applied onto the reflective layer 22 using an applicator, which was dried at 120° C. for two minutes in an air circulating drying oven. Thus, a resin layer having a thickness of 5 µm was formed. Thereafter, it was subjected to electron beam irradiation from the surface side of the resin layer using an electron beam irradiation apparatus (product name "EC250/30/20 mA", manufactured by IWASAKI ELECTRIC CO., LTD.). Thus, the resin layer 23a was formed. The electron beam irradiation was performed under the conditions in which the line speed was 3 m/min, the acceleration voltage was 150 kV, and the irradiation dose was 100 kGy.

Then, the same hard coating layer 23b as in Example 1 was laminated on the resin layer 23a in the same manner as in Example 1. Thus, the protective layer 23 was formed.

Except for these, a visible light-transmissive and infrared-reflective substrate was fabricated in the same manner as in Example 1.

Comparative Example 1

This example is the same as Example 1 except that a glue layer was formed on the hard coating layer 23b to have a thickness of 25 µm, and a PET layer was formed thereon to have a thickness of 50 µm.

Comparative Example 2

The green glass 10 alone was used.

Comparative Example 3

This example is the same as Example 3 except that the protective layer 23 was not formed.

Measurement and Evaluation

Solar transmittance, solar reflectance, normal emissivity, solar heat gain coefficient, and visible light transmittance of the visible light-transmissive and infrared-reflective substrate according to the aforementioned embodiment were measured for each of Examples 1 to 4 and Comparative Examples 1 to 3. The solar transmittance (solar reflectance) is expressed as a ratio of a transmitted radiant flux (reflected radiant flux) with respect to the radiant flux of solar radiation perpendicularly incident on the glass surface. Then, using the obtained values of the solar transmittance and the solar reflectance, solar absorbance was calculated. Specifically, the solar absorbance was calculated as 100%−(solar transmittance+solar reflectance). Further, the solar heat gain coefficient was based on a ratio at which near-infrared rays are transmitted through the green glass 10 (solar transmittance) and a ratio at which far-infrared rays are transmitted through the green glass 10 due to reradiation (solar absorbance). More specifically, the solar heat gain coefficient is expressed as a ratio of the sum of a radiant flux of solar radiation that was perpendicularly incident on the glass surface and was transmitted through the glass portion and a heat flux transferred to the room side by being absorbed by the glass with respect to a radiant flux of solar radiation incident thereon. The visible light transmittance is expressed as a ratio of a light flux of daylight that was perpendicularly incident on the glass surface and was transmitted therethrough with respect to a light flux incident thereon.

The solar transmittance, solar reflectance, solar absorbance, and visible light transmittance were measured using a Hitachi spectrophotometer U4100 in accordance with JIS R3106. The glass surface was set to be a surface on which light was incident. The normal emissivity was determined, in accordance with JIS R 3106-2008 (test method for the transmittance, reflectance, emissivity, and solar heat gain coefficient of sheet glasses), by measuring an infrared specular reflectance at a wavelength of 5 micron to 25 micron using a Fourier transform infrared (FT-IR) spectrometer provided with angle variable reflection accessories (manufactured by Varian Medical Systems, Inc.). The light was incident on the infrared-reflective layer 20 side.

When sunlight (near-infrared rays) incident on the green glass 10 from the outdoors was absorbed by the green glass 10, the temperature of the green glass 10 increases, and far-infrared rays are reradiated from the surface on the outdoor side of the green glass 10 having an increased temperature toward the outdoor side, or from the infrared-reflective layer 20 toward the room side. In this example, radiation properties of far-infrared rays reradiated from the green glass 10 and the infrared-reflective layer 20 toward the room side were investigated by measuring the normal emissivity of the surface on the protective layer 23 side of the infrared-reflective layer 20 for far-infrared rays reradiated from the infrared-reflective layer 20 toward the room side. Table 1 shows these results.

Next, a test for evaluating the abrasion resistance was conducted for each of Examples 1 to 4 and Comparative Examples 1 and 3. The first test and the second test were performed as the abrasion resistance test. The first test was performed such that a steel wool (BONSTAR #0000) as a rubbing material was abutted against a test sample (Examples and Comparative Examples) and was moved back and forth 10 times under a load of 250 g using a 10-barrel pen tester. The second test was performed such that a cloth (calico No. 3) as a rubbing material was abutted against a test sample (Examples and Comparative Examples) and was moved back and forth 1000 times under a load of 500 g using a Gakushin-type rubbing tester. In the first and second tests, the cases showing good abrasion resistance were evaluated as ○, and the cases showing no good abrasion resistance were evaluated as x. Table 1 shows these results. For Comparative Example 2, the test for evaluating the abrasion resistance was not conducted.

TABLE 1

|  | Protective layer | | | | Reflective layer | Base material | Sticking layer | Transmissive member |
| --- | --- | --- | --- | --- | --- | --- | --- | --- |
| Ex. 1 | — | HC 1 µm | OPP 15 µm | Adhesive 1 µm | ITO/APC/ITO 35/11.5/35 nm | PET 50 µm | 12 µm | Green glass 3.86 mm |
| Ex. 2 | — | HC 1 µm | OPP 15 µm | Adhesive 1 µm | ITiO/APC/ITiO 31/14/31 nm | PET 50 µm | 12 µm | Green glass 3.86 mm |

TABLE 1-continued

| | | | | | | | | |
|---|---|---|---|---|---|---|---|---|
| Ex. 3 | — | HC 1 μm | OPP 15 μm | Adhesive 1 μm | ITiO/APC/ITiO 31/18/31 nm | PET 50 μm | 12 μm | Green glass 3.86 mm |
| Ex. 4 | — | HC 1 μm | HNBR 5 μm | Adhesive 1 μm | IZO/AP/IZO 30/14/30 nm | PET 50 μm | 12 μm | Green glass 3.86 mm |
| C. Ex. 1 | PET/Glue 50/25 μm | HC 1 μm | OPP 15 μm | Adhesive 1 μm | ITO/APC/ITO 35/11.5/35 nm | PET 50 μm | 12 μm | Green glass 3.86 mm |
| C. Ex. 2 | — | — | — | — | — | — | — | Green glass 3.86 mm |
| C. Ex. 3 | — | — | — | — | ITiO/APC/ITiO 31/18/31 nm | PET 50 μm | 12 μm | Green glass 3.86 mm |

| | Solar transmittance (%) | Solar reflectance (%) | Solar absorbance (%) | Normal emissivity | Solar heat gain coefficient | Visible light transmittance | Abrasion resistance in first test | Abrasion resistance in second test |
|---|---|---|---|---|---|---|---|---|
| Ex. 1 | 39.3 | 10.6 | 50.2 | 0.26 | 0.51 | 68.8 | ○ | ○ |
| Ex. 2 | 38.5 | 11.0 | 50.5 | 0.22 | 0.50 | 67.6 | ○ | ○ |
| Ex. 3 | 31.0 | 12.6 | 56.4 | 0.19 | 0.44 | 57.6 | ○ | ○ |
| Ex. 4 | 36.3 | 11.8 | 51.9 | 0.12 | 0.47 | 67.1 | ○ | ○ |
| C. Ex. 1 | 39.5 | 10.9 | 49.6 | 0.85 | 0.56 | 69.2 | ○ | ○ |
| C. Ex. 2 | 58.5 | 6.1 | 35.4 | 0.88 | 0.71 | 81.0 | — | — |
| C. Ex. 3 | 36.0 | 10.5 | 53.5 | 0.03 | 0.46 | 69.8 | x | x |

Temperature Reducing Effect

In view of the solar absorbance, Table 1 shows that the visible light-transmissive and infrared-reflective substrates of Examples 1 to 4 respectively had a solar absorbance of 50.2%, 50.5%, 56.4%, and 51.9%, which were higher than the solar absorbance of the green glass 10 of Comparative Example 2 alone (35.4%). Further, in view of the visible light transmittance, the visible light-transmissive and infrared-reflective substrates of Examples 1 to 4 respectively had a visible light transmittance of 68.8%, 67.6%, 57.6%, and 67.1%, which were lower than the visible light transmittance (81.0%) of the green glass 10 of Comparative Example 2 alone. However, the green glass 10 of Comparative Example 2 alone exhibited a value (0.88) of the normal emissivity that was significantly higher than 0.50, where the ratio of reradiation of far-infrared rays from the green glass 10 into the room was high. On the other hand, the visible light-transmissive and infrared-reflective substrates of Examples 1 to 4 exhibited values (respectively, 0.26, 0.22, 0.19, and 0.12) of the normal emissivity that were significantly lower than 0.50, where the ratio of far-infrared rays reradiated from the green glass 10 to the outdoors was high. Accordingly, in the visible light-transmissive and infrared-reflective substrates of Examples 1 to 4, the ratio of reradiation of far-infrared rays from the green glass 10 into the room was low (good radiation properties of far-infrared rays), and thus good heat insulating properties were exhibited.

Further, the green glass 10 of Comparative Example 2 had a solar transmittance of 58.5%, whereas the visible light-transmissive and infrared-reflective substrates of Examples 1 to 4 respectively had a solar transmittance of 39.3%, 38.5%, 31.0%, and 36.3%. The visible light-transmissive and infrared-reflective substrates of Examples 1 to 4 were configured to have a significantly reduced solar transmittance by providing the infrared-reflective layer 20 on the green glass 10, as compared to the case of providing the green glass 10 alone. Accordingly, the visible light-transmissive and infrared-reflective substrates of Examples 1 to 4 exhibit good reflective performance (heat shielding properties) for sunlight (near-infrared rays).

As described above, the visible light-transmissive and infrared-reflective substrates of Examples 1 to 4 showed better values of both solar transmittance and normal emissivity than in the case of the green glass 10 of Comparative Example 2 alone, thereby showing good heat shielding properties and heat insulating properties. Therefore, for example, when the visible light-transmissive and infrared-reflective substrates of the present examples are used with a visible light-transmissive substrate having high solar absorbance such as green glass, they can suppress a temperature increase inside the room.

It should be noted that, in the visible light-transmissive and infrared-reflective substrates of Examples 2 and 3, the thickness of the semi-transparent metal layer 22a made of APC (AgPdCu) was set to be larger (respectively, 14 μm and 18 μm) than in the visible light-transmissive and infrared-reflective substrate of Example 1. Accordingly, the visible light-transmissive and infrared-reflective substrates of Examples 1, 2, and 3 exhibited values (respectively, 39.3%, 38.5%, and 31.0%) of the solar transmittance that gradually decrease in their order (as the thickness of the semi-transparent metal layer 22a increased). Further, in the visible light-transmissive and infrared-reflective substrates of Examples 1, 2, and 3, values (respectively, 0.26, 0.22, and 0.19) of the normal emissivity also gradually decrease in their order (as the thickness of the semi-transparent metal layer 22a increased). It can be understood from these results that the larger the thickness of the semi-transparent metal layer 22a, the lower the solar transmittance and the normal emissivity, and the higher the effects of suppressing the temperature increase.

Further, in the visible light-transmissive and infrared-reflective substrate of Comparative Example 1, a glue layer was formed on the hard coating layer 23b to have a thickness of 25 μm, and a PET layer was formed thereon to have a thickness of 50 μm, as described above. Therefore, the normal emissivity was significantly higher (0.85) than 0.50, though the solar transmittance was similar to the solar transmittance of the visible light-transmissive and infrared-reflective substrates of Examples 1 to 3. Therefore, the visible light-transmissive and infrared-reflective substrate of Comparative Example 1 failed to prevent the thermal effects (reradiation heat) of far-infrared rays due to reradiation, and failed to show a good effect to suppress the temperature increase.

Comparative Example 3 had values of solar transmittance, solar reflectance, solar absorbance, solar heat gain coefficient, and visible light transmittance that were similar to those of the visible light-transmissive and infrared-reflective substrates of Examples 1 to 4. Further, Comparative Example 3 still had a problem of poor durability, as described below, because the protective layer 23 was not formed so that the reflective layer 20 having low abrasion resistance was exposed, though the normal emissivity was significantly lower (0.03) than 0.50.

Test for Evaluating Abrasion Resistance

As a result of the test for evaluating abrasion resistance, the visible light-transmissive and infrared-reflective substrate of Comparative Example 3 failed to show good results in the first test and the second test of the abrasion resistance test since the protective layer 23 was not formed, whereas the visible light-transmissive and infrared-reflective substrates of Examples 1 to 4 and the visible light-transmissive and infrared-reflective substrate of Comparative Example 1 showed good abrasion resistance. It was found from these results that the visible light-transmissive and infrared-reflective substrates provided with a protective layer had good durability (abrasion resistance), since the reflective layer having low abrasion resistance was not exposed.

Next, using the aforementioned visible light-transmissive and infrared-reflective substrate (the infrared-reflective layer 20) used in each of Examples and Comparative Examples, experiments for comparing the temperature inside a car in Examples 5 and 6, and Comparative Examples 4 and 5 were conducted.

Example 5

Two light cars (kei cards) of the same type were prepared, and the infrared-reflective layer (infrared-reflective film) 20 used in Example 1 was attached to all the window glass on the room side of each of the light cars. Then, the cooling intensity of an air-conditioner provided inside the car was set to the fifth step in six steps, and the airflow of the air-conditioner was set to the fifth step in eight steps. Then, the internal air was circulated. In the state where the light car was stopped with its front facing southwest, a mannequin was seated on the rear seat on the driver's seat side, and the temperature (shown as "inside car (thermography)" in Table 2 and Table 3 below) on the surface of the mannequin was measured using a thermography. Further, the space temperature (shown as "inside car (window side)" in Table 2 and Table 3 below) of the rear seat at a distance of about 5 cm on the room side from the window on the driver's seat side was measured using a thermocouple covered by an aluminum foil. Further, the temperature (shown as "inside car (window surface)" in Table 2 and Table 3 below) on the surface (the surface of the infrared-reflective film 20 or the surface of the green glass 10) on the room side of the window was measured by the thermocouple. The measurement was performed at 13:30 on 11 Aug. 2011.

Comparative Example 4

This example is the same as Example 5 except that the infrared-reflective layer (infrared-reflective film) 20 used in Comparative Example 1 was attached to the window glass on the room side of each of the light cars. Table 2 shows these results.

TABLE 2

|  | Inside car (thermography) | Inside car (window side) | Outside car (window surface) |
| --- | --- | --- | --- |
| Ex. 5 | 28.7° C. | 25.4° C. | 42.4° C. |
| C. Ex. 4 | 30.9° C. | 27.4° C. | 42.0° C. |

It can be seen from Table 2 that the temperature inside car (thermography) and the temperature inside car (window side) in the results of Example 5 were lower than those in the results of Comparative Example 4. It was recognized that, since the normal emissivity (0.26) of the infrared-reflective layer (infrared-reflective film) 20 used in Example 5 (which was the same as in Example 1) was significantly lower than the normal emissivity (0.85) of the infrared-reflective layer (infrared-reflective film) 20 used in Comparative Example 4 (which was the same as in Comparative Example 1), high effects of suppressing the temperature increases inside car (thermography) and inside car (window side) were exerted.

Example 6

The measurement was performed in the same manner as in Example 5 except that the light car was stopped with its front facing south. The measurement was performed at 15:30 on 14 Aug. 2011.

Comparative Example 5

This example is the same as Example 6 except that the infrared-reflective layer (infrared-reflective film) 20 was not provided. Table 3 shows these results.

TABLE 3

|  | Inside car (thermography) | Inside car (window side) | Outside car (window surface) |
| --- | --- | --- | --- |
| Ex. 6 | 31.0° C. | 24.5° C. | 47.5° C. |
| C. Ex. 5 | 33.6° C. | 28.5° C. | 45.7° C. |

It can be seen from Table 3 that the temperature inside car (thermography) and the temperature inside car (window side) were lower in the results of Example 6 than those in the results of Comparative Example 5. It was recognized that, since the infrared-reflective layer (infrared-reflective film) 20 used in Example 1 was attached to all the window glass on the room side of each of the light cars, the effects of suppressing the temperature increases inside car (thermography) and inside car (window side) due to the solar transmittance and the normal emissivity being low were higher in Example 6 than in Comparative Example 5 in which the infrared-reflective layer (infrared-reflective film) 20 was not provided.

Further, it can be seen from Table 3 that the temperature inside car (window surface) in Example 6 was higher than in Comparative Example 5. This was probably because the solar absorbance in Example 6 was higher than the solar absorbance in Comparative Example 5.

Second Embodiment

Hereinafter, a second embodiment of the visible light-transmissive and infrared-reflective substrate according to the present invention is described.

A visible light-transmissive and infrared-reflective substrate according to this embodiment is formed, for example, in order to give a privacy protection by making it difficult to see the inside of the room from the outdoors through the visible light-transmissive substrate layer. The visible light-transmissive and infrared-reflective substrate according to this embodiment includes a visible light-transmissive substrate layer that is disposed so as to serve as a partition between inside and outside of a room and that has a visible light transmittance of at least 50%, and an infrared-reflective layer that is laminated on a surface on the room side of the visible light-transmissive substrate layer and that has a visible light transmittance of not more than 50%.

The visible light-transmissive and infrared-reflective substrate according to this embodiment has the same configurations as the visible light-transmissive and infrared-reflective substrate according to the first embodiment except that the visible light-transmissive substrate layer has a visible light transmittance of at least 50%, and the infrared-reflective layer 20 has a visible light transmittance of not more than 50%, as described above. Therefore, the same configurations are denoted by the same reference numerals, and detailed descriptions thereof are not repeated.

The visible light-transmissive substrate layer according to this embodiment has a solar absorbance of at least 30%. Examples of the visible light-transmissive substrate layer include glass and a transparent resin substrate.

As the infrared-reflective layer according to this embodiment, a smoke film is employed. However, the infrared-reflective layer is not limited to the smoke film employed in this embodiment, as long as it has a visible light transmittance of not more than 50%. The infrared-reflective layer includes a reflective layer configured to reflect infrared rays and a protective layer laminated on the surface on the room side of the reflective layer. The normal emissivity of the surface on the protective layer side of the infrared-reflective layer is set to be not more than 0.50.

The visible light-transmissive substrate layer according to this embodiment has a visible light transmittance of at least 50% as described above, and the visible light-transmissive substrate layer itself has a higher solar transmittance, though the visible light-transmissive substrate layer itself has a lower solar absorbance, than the visible light-transmissive substrate layer of the visible light-transmissive and infrared-reflective substrate according to the first embodiment. Then, according to the visible light-transmissive and infrared-reflective substrate of this embodiment, the solar transmittance is reduced by the infrared-reflective layer. Therefore, sunlight (near-infrared rays) directly entering the room from the outdoors through the visible light-transmissive substrate layer can be reduced. Further, although formation of the infrared-reflective layer on the visible light-transmissive substrate layer increases the solar absorbance, it can suppress a temperature increase inside the room by reducing reradiation heat due to the far-infrared rays that are absorbed by the visible light-transmissive substrate layer and reradiated from the visible light-transmissive substrate layer into the room side. Further, the infrared-reflective layer having low visible light transmittance is laminated on the visible light-transmissive substrate layer having high visible light transmittance, which makes it difficult to see the inside of the room from the outdoors through the visible light-transmissive substrate layer. Thus, a privacy protection, for example, can be given.

It should be noted that the visible light-transmissive and infrared-reflective substrate according to the present invention is not limited to the aforementioned embodiments, and various modifications can be made without departing from the gist of the present invention.

For example, in the aforementioned embodiments, the reflective layer 2 is formed by vapor deposition. However, the reflective layer may be formed by separately preparing a reflective layer from the base material, for example, using a reflective film and attaching the reflective film to the base material.

Further, in the aforementioned embodiments, the infrared-reflective layer (infrared-reflective film) is laminated on (attached to) the visible light-transmissive substrate layer via a glue layer. However, there is no limitation to this. For example, the infrared-reflective layer may be directly formed on the visible light-transmissive substrate layer.

Further, in the aforementioned embodiments, the protective layer is obtained by laminating the hard coating layer on the resin layer. However, the protective layer may be the resin layer, more specifically, the olefin-based resin layer alone, or may be the hard coating layer alone. In view of the abrasion resistance, it is preferable that the protective layer include a hard coating layer.

Further, in the aforementioned embodiments, the resin layer is bonded to the surface of the reflective layer using an adhesive. However, there is no limitation to this.

REFERENCE SIGNS LIST

10: Visible light-transmissive substrate layer
20: Infrared-reflective layer
21: Base material
21a: One surface
21b: Second surface
22: Reflective layer
22a: Semi-transparent metal layer
22b, 22c: Transparent layer
23: Protective layer
23a: Resin layer
23b: Hard coating layer
23c: Adhesive layer
24: Glue layer

The invention claimed is:

1. A visible light-transmissive and infrared-reflective substrate, comprising:
   a visible light-transmissive substrate layer disposed so as to serve as a partition between inside and outside of a room; and
   an infrared-reflective layer laminated on a surface on the room side of the visible light-transmissive substrate layer, wherein
   the visible light-transmissive substrate layer has a solar absorbance of at least 30%,
   the infrared-reflective layer includes a reflective layer configured to reflect infrared rays and a protective layer laminated on a surface on the room side of the reflective layer, and
   normal emissivity of a surface on the protective layer side of the infrared-reflective layer is not more than 0.50.

2. A visible light-transmissive and infrared-reflective substrate, comprising
   a visible light-transmissive substrate layer disposed so as to serve as a partition between inside and outside of a room, the visible light-transmissive substrate layer having a visible light transmittance of at least 50%; and
   an infrared-reflective layer laminated on a surface on the room side of the visible light-transmissive substrate layer, the infrared-reflective layer having a visible light transmittance of not more than 50%, wherein
   the visible light-transmissive substrate layer has a solar absorbance of at least 30%, the infrared-reflective layer includes a reflective layer configured to reflect infrared rays and a protective layer laminated on a surface on the room side of the reflective layer, and normal emissivity of a surface on the protective layer side of the infrared-reflective layer is not more than 0.50.

3. The visible light-transmissive and infrared-reflective substrate according to claim 1, wherein the infrared-reflective layer is an infrared-reflective film attached to the surface on the room side of the visible light-transmissive substrate layer.

4. The visible light-transmissive and infrared-reflective substrate according to claim 2, wherein the infrared-reflective layer is an infrared-reflective film attached to the surface on the room side of the visible light-transmissive substrate layer.

5. The visible light-transmissive and infrared-reflective substrate according to claim 1, wherein the visible light-transmissive substrate layer is glass or a resin substrate.

6. The visible light-transmissive and infrared-reflective substrate according to claim 2, wherein the visible light-transmissive substrate layer is glass or a resin substrate.

7. The visible light-transmissive and infrared-reflective substrate according to claim 1, wherein the protective layer includes a hard coating layer laminated on the reflective layer.

8. The visible light-transmissive and infrared-reflective substrate according to claim 2, wherein the protective layer includes a hard coating layer laminated on the reflective layer.

9. The visible light-transmissive and infrared-reflective substrate according to claim 1, wherein the protective layer includes a resin layer.

10. The visible light-transmissive and infrared-reflective substrate according to claim 2, wherein the protective layer includes a resin layer.

11. The visible light-transmissive and infrared-reflective substrate according to claim 1, wherein the reflective layer includes a semi-transparent metal layer.

12. The visible light-transmissive and infrared-reflective substrate according to claim 2, wherein the reflective layer includes a semi-transparent metal layer.

* * * * *